May 19, 1931.  W. WITZLER ET AL  1,806,378

WATER HEATER

Filed April 23, 1928

Inventors:
Willi Witzler and
Paul Friedrich Gustav Güth, by Langner, Parry, Card & Langner
Attys.

Patented May 19, 1931

1,806,378

UNITED STATES PATENT OFFICE

WILLI WITZLER AND PAUL FRIEDRICH GUSTAV GÜTH, OF HAMBURG, GERMANY

WATER HEATER

Application filed April 23, 1928, Serial No. 272,208, and in Germany September 13, 1927.

This invention relates to water-heaters and particularly to that kind of water-heaters, which may be used for heating water rapidly for domestic purposes in the kitchen, bathroom and the like, and for other purposes.

Water-heaters have been proposed heretofore comprising concentric tubes onto the sides of which water was delivered by pipes from above, and which were heated on the other side of the walls of the tubes by heated gases.

The water, which issued from such heaters, was not very hot, in fact it appeared impossible to raise the temperature up to boiling point, particularly if the heater was so constructed that it should deliver water in a very short time. The object of the present invention is to construct a water-heater, by which very rapidly water is heated up to boiling temperature. In the known heaters mentioned above the concentric tubes are provided with trough-shaped corrugations adapted to receive and guide the water downwardly in compact or bulky though thin streams, and moreover the said tubes were immovable. Such compact streams of water have the drawback that they cannot be even throughout in their thickness, since the pressure of the water supplied is always subject to fluctuations. For this reason it was impossible to produce hot water of equal temperature.

According to the present invention a cylindrical drum is provided on the face of which a thin film of water is produced by compelling the water to be spread out on the top while the drum is rotated. The cylindrical or conical drum whch is suspended from or supported on a central axis is rotated by any convenient means. By the rotation of the drum the water is distributed on moving down along the surface of the drum in an even thin film in a perfectly uniform manner, the streams broadening out into bands or films, running downward in spiral paths thus contacting and flowing one into another and securing perfectly uniform distribution. A heated current of gases is compelled to move upwardly within or without said drum.

Thus a very effective and uniform transmission of heat to the water is secured, producing in a very short time hot and even boiling water, which may be collected at the bottom of the drum and taken therefrom in any desired manner. Owing to the uniform distribution of the film of water of the drum the heat of the issuing water will be perfectly uniform. To automatically secure the rotation of the drum on its top blades are provided, against which the jet projecting from the water pipe impinges.

Fig. 1 of the drawings is a vertical section of a heater constructed according to the present invention, and Fig. 2 is a vertical section of a modification.

Figure 1:
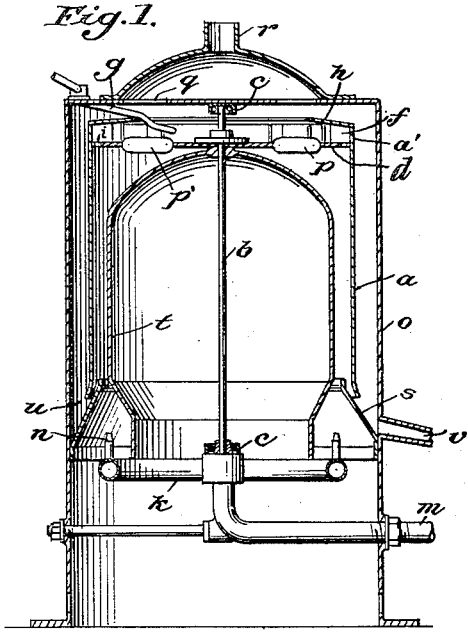

In the construction shown in Fig. 1 the drum $a$ on which a film of water is compelled to run down, has the shape of a bell rotatably, arranged on a central spindle $b$ journaled in bearings $c$, preferably ball bearings. In this construction it is assumed that the drum is rotated automatically by the force of the incoming water. Above the top $d$ the drum has a prolongation $a'$, and on the top-or covering-disk $d$ a series of blades $f$ are distributed inside the prolongation $a'$ at an angle thereto to form a turbine. A water pipe $g$ is arranged to project a jet of water into the space occupied by the blades $f$, which may be pocketed by an overhanging portion $h$ of the prolongation or flange $a'$, the pipe $g$ being so shaped or positioned, that a jet of water issuing out therefrom impinges against the blades $f$, thus compelling the drum $a$ to rotate, perforations $i$ being provided in the top or disk $d$ intermediate of the blades $f$ close to the drum $a$, to allow the water to run down in a thin film on the inside of the rotating drum $a$, the path the water takes on the drum obviously being helical.

Below the drum $a$ either a circular series of burners or nozzles $n$ or a single circular burner $k'$ is arranged connected with a gas pipe $m$, by which gas is led either to the nozzles $n$ or the burner $k'$. The apparatus is enclosed within a casing $o$ to the base of which the gas pipe $m$ is secured in any convenient manner. When the burner below the drum $a$ is lighted heated air and products of combustion pass up into the drum $a$. The openings $p$ in the top $d$ of the drum $a$ and openings $q$ in the top of the casing $o$ allow the gases of combustion to escape into the chimney $r$.

Means to collect the water are provided below the drum $a$. In the construction shown in Fig. 1 a truncated cone $s$ extending with its upper end into the drum $a$ is fastened inside the casing $o$, leaving between the lower edge of the drum and the cone, and between the cone $s$ and a fixed bell $t$, annular spaces. By the first described annular space the water flows down into the vessel $u$ formed by the cone $s$ and the wall of the casing $o$, and by the annular space formed between the cone $s$ and the bell $t$ the gases of combustion pass into the drum $a$. While moving upwardly the gases are guided between the drum $a$ and the bell $t$. The heated water may issue from the vessel $u$ by the pipe $v$.

In order to increase the draft for pulling the combustion gases along the drum, means such as blades $p'$ are provided in the opening $p$ of the top $d$ thereby forming an exhaust fan. As is evident in Figure 1, the blades $p'$ are mounted in the opening $p''$ in such manner that they will project both above and below the opening $p$, which opening in the present instance takes the form of slots of substantially the same length as the blades, the fans being intended merely to assist the upward movement of the current of heated gas. No particular means for rotating the blades are illustrated, such means not forming an essential feature of the present invention, and a multiplicity of such means being obvious at once to the skilled artisan.

In the construction described above the products of combustion come in contact with the water to be heated. In the apparatus shown in Figs. 2 and 4 the products of combustion will not come in contact with the water, and moreover in Fig. 2 means are shown to preheat the water before it is distributed about the drum.

The wall $o'$ of the casing in this apparatus is double forming a jacket, to which water is supplied by the pipe $w$, and from which the water on top is taken by the pipe $g$ constructed in the same manner as described above. The drum $a$ in this construction comprises a wall $a^2$ having on top a turbine formed by blades $f$ and flanges $a'$ and $h$ in similar manner as described with reference to Fig. 1. The drum $a^2$ is journaled by ball bearings $c'$ about the central spindle $b$, and below the drum $a$ a dish $u'$ is provided for collecting the heated water which may issue by the pipe $v$. The dish may be given the same outer diameter as the drum $a^2$ to allow the products of combustion produced by the gas burner $k'$ to pass without hindrance into the space between the drum $a^2$ and the double wall of the casing. The construction thus differs from that shown in Fig. 1 inasmuch as the products of combustion will not move upwardly within the drum, but outside it, so that the gases will not contact with the water. The bottom $d'$ of the drum is perforated near the outer cylindrical wall to allow the heated water to freely flow into the vessel or dish $u'$.

As to the speed with which the drum is to rotate it is to be noticed that if the drum has a diameter of 0.2 m., then 200 to 300 revolutions in the minute will be sufficient, so that 120 to 200 m. peripheral speed in the minute will result. Trials have demonstrated that by the aid of a drum of 20 cm. diameter and a height of 25 cm. it is possible to heat one litre of water from 5° C. to boiling point per minute, with a consumption of 30 litres gas having 3.8 calories per cubic centimeter.

Figure 4:
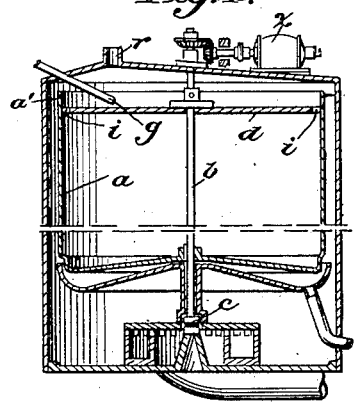
Fig. 4 is a sectional elevation of a heater driven mechanically by an electric motor.
Figure 2:
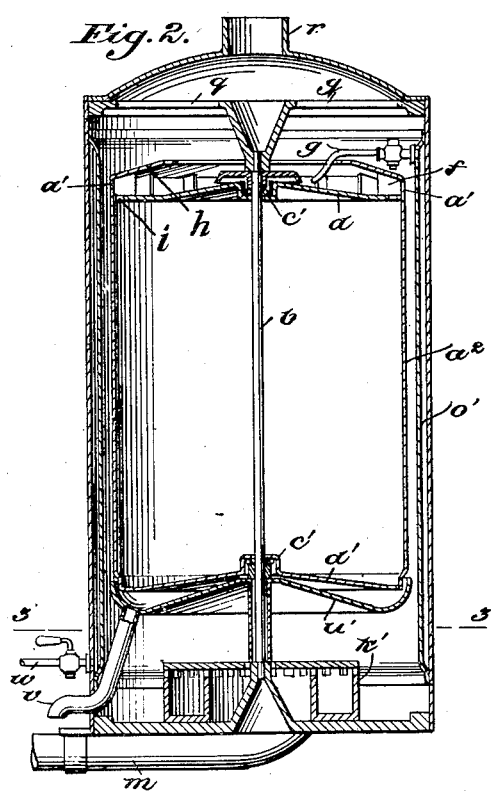
Figure 3:
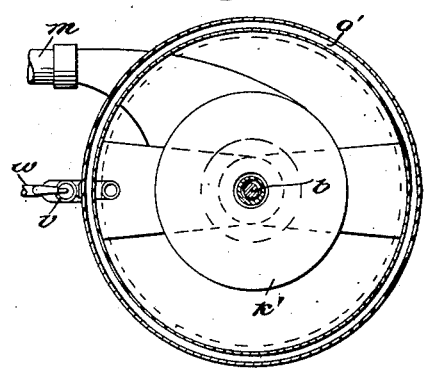
Fig. 3 is a section along the line 3—3 of Fig. 2.

In the construction shown in Fig. 4 an electric motor $x$ is used to rotate the drum $a$, the water being introduced on a disk $d$ having openings $i$ similar to Figs. 1 and 2.

We claim:—

1. A water heater comprising a vertical drum mounted to rotate about the central axis, a water pipe arranged to direct a jet of water against the upper end of the drum whereby the water may run down the walls of the drum, means for producing a heating current of gases to move upwardly along the drum to heat the film of water passing down said drum, and means for collecting the heated water.

2. A water heater, comprising a substantially vertical drum adapted to rotate about a substantially vertical axis and down the walls of which drum the water to be heated is passed in a film; blades at the upper end of said drum; a water pipe arranged to direct a jet of water against the blades to effect rotation of the drum; means for producing a current of heated gases and for passing the same upwardly along the drum to heat the downwardly passing film of water; and means collecting the said water.

3. A water heater, comprising a drum adapted to rotate about a substantially vertical axis and down the walls of which drum the water to be heated is passed in a film, a substantially horizontal disk at the upper end of said drum, a prolongation of the drum above said disk, a series of blades arranged on the said disk at an angle to the said prolongation of the drum, the said disk having perforations therein adjacent the drum and intermediate of the blades, a water pipe arranged to direct a jet of water against the blades to effect rotation of the drum, means for producing a current of heated gases and for passing the same upwardly along the drum to heat the downwardly passing film of water, and means for collecting the heated water.

4. A water heater, comprising a substantially vertical drum adapted to rotate about a substantially vertical axis, both the top and the bottom of the said drum having a series of perforations therein, adjacent the vertical connecting wall, a flange on the top of the said drum forming a prolongation of the vertical wall, a series of blades on the top of the drum and arranged at an angle to the said flange intermediate the said perforations, a water pipe arranged to direct a jet of water against the blades to effect rotation of the drum, means for collecting the water below the drum, and means for producing a current of heated air and for passing the same upwardly in contact with the wall for the drum.

5. A water heater according to claim 4, comprising a casing having a double wall, the double walls forming a water jacket; a water pipe connection with said jacket substantially at the bottom thereof to supply fresh water thereto; and a pipe leading from the top of the jacket and constituting a water pipe to direct a jet of water to the blades.

6. A water heater according to claim 4, wherein the means for collecting the water comprises a water-receiver member arranged below the drum, the rim of the said member having substantially the same diameter as the drum, whereby the stream of heated air may freely pass around the periphery of the said member and along the wall of the said heater.

7. A water heater according to claim 4 wherein the means for collecting the water comprises a water-receiving member arranged below the drum, the rim of the said member having substantially the same diameter as the drum whereby the stream of heated air is adapted to freely pass around the periphery of the said member and along the walls of the drum, and an outlet pipe leading from the said member to the exterior, thus forming an outlet for the heated water.

8. A water heater, comprising a substantially vertically disposed rotary drum down which the water to be heated is passed in the form of a film; means for directing water against the drum at the top thereof; means for producing a current of heated gases and for moving the same upwardly along the drum to heat the downwardly passing film of water; and means for collecting the heating water.

In testimony whereof we have signed our names to this specification.

WILLI WITZLER.
PAUL FRIEDRICH GUSTAV GÜTH.